United States Patent
Choi et al.

(10) Patent No.: US 10,230,091 B2
(45) Date of Patent: Mar. 12, 2019

(54) BATTERY

(71) Applicant: SAMSUNG SDI CO., LTD., Yongin-si (KR)

(72) Inventors: Yoonjin Choi, Yongin-si (KR); Jangho Yoon, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 483 days.

(21) Appl. No.: 14/935,285

(22) Filed: Nov. 6, 2015

(65) Prior Publication Data

US 2016/0141590 A1 May 19, 2016

(30) Foreign Application Priority Data

Nov. 18, 2014 (KR) .................. 10-2014-0160857

(51) Int. Cl.
 *H01M 2/26* (2006.01)
 *H01M 2/04* (2006.01)
 *H01M 10/0525* (2010.01)

(52) U.S. Cl.
 CPC .......... *H01M 2/26* (2013.01); *H01M 2/0482* (2013.01); *H01M 10/0525* (2013.01); *H01M 2220/20* (2013.01); *H01M 2220/30* (2013.01); *Y02E 60/122* (2013.01)

(58) Field of Classification Search
 CPC ........ H01M 2/06; H01M 2/26; H01M 2/0478; H01M 10/0525; H01M 2220/20; H01M 2220/30
 See application file for complete search history.

(56) References Cited

U.S. PATENT DOCUMENTS

| 5,663,013 | A | 9/1997 | Narukawa et al. | |
| 6,743,546 | B1 * | 6/2004 | Kaneda | H01M 2/021 429/127 |
| 7,855,014 | B2 * | 12/2010 | Bang | H01M 2/06 429/178 |
| 2010/0330415 | A1 | 12/2010 | Park | |

FOREIGN PATENT DOCUMENTS

| JP | 8-329911 A | | 12/1996 |
| JP | 2011-76952 A | | 4/2011 |
| JP | 2013175516 | * | 9/2013 |
| JP | 2014-32967 A | | 2/2014 |
| KR | 10-2011-0000994 A | | 1/2011 |

OTHER PUBLICATIONS

Abstract and English Machine Translation of Japanese Patent No. 2011-76952 A, dated Apr. 14, 2011, 21 Pages.
Abstract and English Machine Translation of Japanese Patent No. 2014-32967 A, dated Feb. 20, 2014, 19 Pages.

* cited by examiner

*Primary Examiner* — Ula C Ruddock
*Assistant Examiner* — Thomas H. Parsons
(74) *Attorney, Agent, or Firm* — Lewis Roca Rothgerber Christie LLP

(57) ABSTRACT

A battery includes an electrode assembly; a positive electrode tab and a negative electrode tab both extending from the electrode assembly; an insulation spacer having openings through which the positive and negative electrode tabs extend, and a positive electrode lead and a negative electrode lead coupled to the respective positive and negative electrode tabs in the insulation spacer, wherein each opening has a first opening and a second opening, and wherein the first opening is at a lower region of the insulation spacer and the second opening is at a side region of the insulation spacer.

12 Claims, 13 Drawing Sheets

BATTERY

CROSS-REFERENCE TO RELATED APPLICATION

This application claims priority to and the benefit of Korean Patent Application No. 10-2014-0160857, filed on Nov. 18, 2014 in the Korean Intellectual Property Office, the content of which is herein incorporated by reference in its entirety.

BACKGROUND

1. Field

Embodiments of the present invention relate to a battery.

2. Description of the Related Art

In general, unlike primary batteries, which are not designed to be recharged, secondary batteries can be repeatedly charged and discharged.

According to technological developments and increases in production of mobile devices, such as mobile phones and notebook computers, the demand for secondary batteries as an energy source is rapidly increasing. Recently, research into secondary batteries for use in electric vehicles or hybrid vehicles as an alternative energy source to fossil fuels is being actively conducted.

SUMMARY

Embodiments of the present invention provide a battery which includes an insulation spacer interposed between an electrode assembly and a cap plate and receiving electrode tabs, which extend from the electrode assembly, from a lower region and a side region thereof, thereby easily achieving alignment between the electrode tabs and the insulation spacer, improving positioning of the electrode tabs and the insulation spacer, and easily welding the electrode tabs to electrode leads.

Embodiments of the present invention also provide a battery which includes an insulation spacer interposed between an electrode assembly and a cap plate, thereby improving insulation of the electrode assembly.

Embodiments of the present invention also provide a battery, which provides a robust insulating characteristic of an electrode assembly from electrode tabs even under severe environments, such as high-frequency vibrations or fall shock.

These and other objects of the present invention will be described in or will be apparent from the following description of example embodiments.

According to an aspect of the present invention, there is provided a battery including an electrode assembly; a positive electrode tab and a negative electrode tab extending from the electrode assembly; an insulation spacer having openings through which the positive and negative electrode tabs extend; and a positive electrode lead and a negative electrode lead coupled to the respective positive and negative electrode tabs in the insulation spacer, wherein each opening has a first opening and a second opening, and wherein the first opening is at a lower region of the insulation spacer and the second opening is at a side region of the insulation spacer.

The first opening and the second opening may communicate with each other.

The battery may further include an insulation member surrounding the side region of the insulation spacer and covering the second opening.

The insulation spacer may include a pair of long sides spaced apart from each other, a pair of short sides connected to the pair of long sides and spaced apart from each other, and a bottom portion at a bottom end of the long sides and the short sides, and the first opening may be in the bottom portion.

The insulation spacer may have an open portion between the long sides and the short sides.

The bottom portion of the insulation spacer may contact the electrode assembly.

The second opening may be in at least one of the pair of long sides.

A reinforcement unit may be at a boundary region between the first opening and the second opening.

A reinforcement unit may extend across the second opening at a top end or a bottom end of one of the long sides.

Widths of the first and second openings may be greater than respective widths of the positive electrode tab and the negative electrode tab.

As described above, because the battery according to embodiments of the present invention includes an insulation spacer interposed between an electrode assembly and a cap plate and receiving electrode tabs extending from the electrode assembly from a lower region and a side region thereof, alignment between the electrode tabs and the insulation spacer can be improved, coupling efficiency between the electrode tabs and the insulation spacer can be improved, and the electrode tabs can be easily welded to electrode leads.

In addition, because the battery according to embodiments of the present invention includes an insulation spacer interposed between an electrode assembly including electrode tabs and a cap plate, the electrode assembly having an improved insulating characteristics can be provided.

Further, the battery according to embodiments of the present invention battery can provide a robust insulating characteristic of an electrode assembly from electrode tabs even under severe environments, such as high-frequency vibrations or fall shock.

BRIEF DESCRIPTION OF THE DRAWINGS

The above and other features and characteristics of the present invention will become more apparent by describing, in detail, example embodiments thereof with reference to the attached drawings in which.

DETAILED DESCRIPTION

Figure 1A:
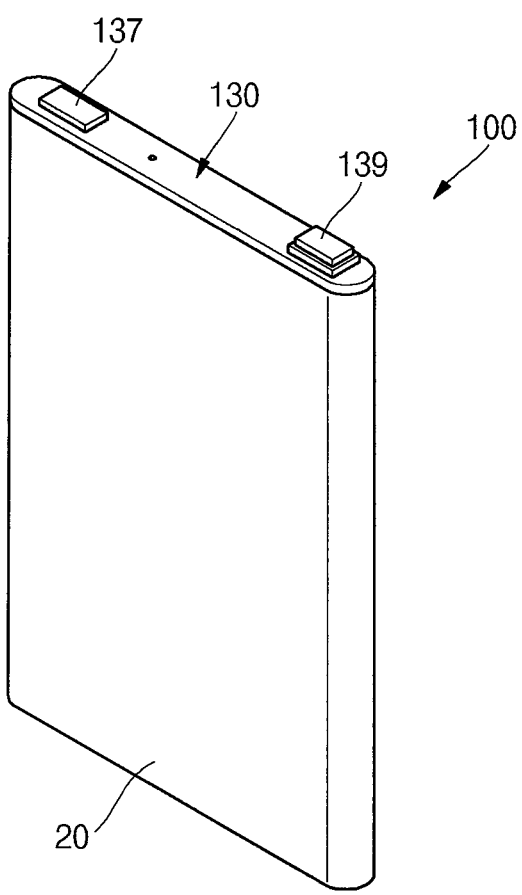
FIGS. 1A and 1B are a perspective view and an exploded perspective view, respectively, illustrating a battery according to an embodiment of the present invention.

Some example embodiments of the present invention will be described more fully hereinafter with reference to the accompanying drawings; however, the present invention may be embodied in different forms and should not be construed as being limited to the embodiments set forth herein. Rather, these embodiments are provided so that this disclosure will be thorough and complete and will fully convey the present invention to those skilled in the art.

In the drawings, thicknesses of layers and regions may be exaggerated for clarity. Like numbers refer to like elements throughout. As used herein, the term "and/or" includes any and all combinations of one or more of the associated listed items.

The terminology used herein is for the purpose of describing particular embodiments and is not intended to be limiting of the invention. As used herein, singular forms are intended to include the plural forms as well, unless the context clearly indicates otherwise. It will be further understood that the terms "includes," "including," "comprises," and/or "comprising," when used in this specification, specify the presence of the stated features, integers, steps, operations, elements, and/or components but do not preclude the presence or addition of one or more other features, integers, steps, operations, elements, components, and/or groups thereof.

It will be understood that, although the terms "first," "second," etc. may be used herein to describe various members, elements, regions, layers, and/or parts, these members, elements, regions, layers, and/or parts should not be limited by these terms. These terms are merely used to distinguish one member, element, region, layer, and/or part from another member, element, region, layer, and/or part. Thus, for example, a first member, element, region, layer, and/or part discussed below could be termed a second member, element, region, layer, and/or part without departing from the teachings of the present invention.

It will be understood that when an element or layer is referred to as being "on", "connected to", or "coupled to" another element or layer, it may be directly on, connected, or coupled to the other element or layer or one or more intervening elements or layers may also be present. When an element is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements. Further, the use of "may" when describing embodiments of the present invention relates to "one or more embodiments of the present invention". Expression, such as "at least one of," when preceding a list of elements, modify the entire list of elements and do not modify the individual elements of the list. Also, the term "exemplary" is intended to refer to an example or illustration.

In addition, embodiments of the battery described throughout the specification may be a rechargeable secondary battery, such as a lithium ion battery, a lithium polymer battery, or a lithium ion polymer battery, a small-sized battery employed in a smart phone, a mobile phone, a tablet PC, a notebook PC, or a digital camera, and/or a large-sized battery employed in an electric vehicle, a hybrid vehicle, an electric bicycle, or an electric motorcycle, but aspects of the present invention are not limited thereto.

Figure 1B:
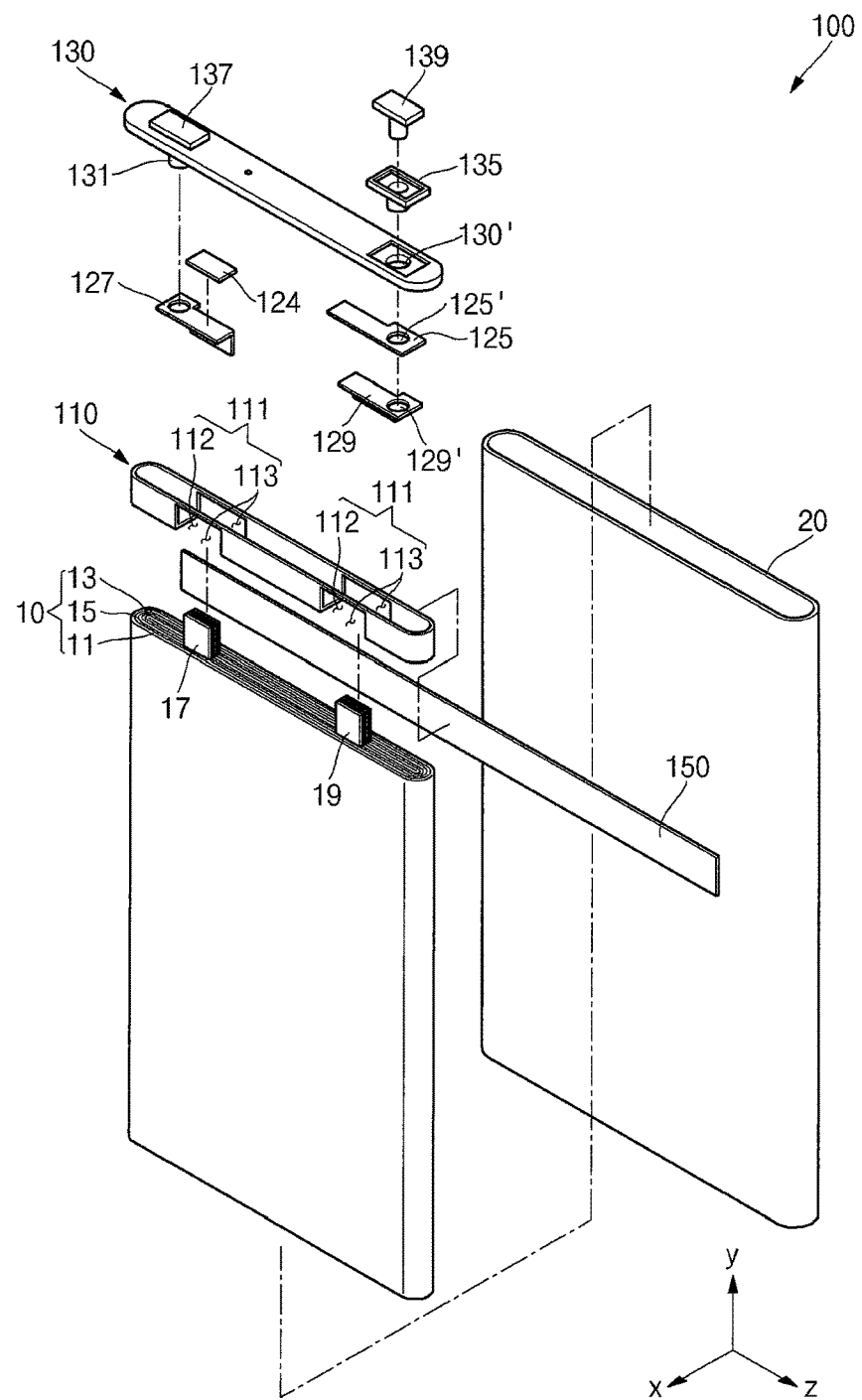

FIGS. 1A and 1B are a perspective view and an exploded perspective view, respectively, illustrating a battery according to an embodiment of the present invention.

Referring to FIGS. 1A and 1B, the battery 100 includes an electrode assembly 10, an insulation spacer 110 disposed on the electrode assembly 10, a case 20 accommodating the electrode assembly 10 and the insulation spacer 110, and a cap plate 130 at a top portion of the case 20.

The electrode assembly 10 includes a positive electrode plate 11, a negative electrode plate 13, and a separator 15 and is accommodated and sealed in the case 20 together with an electrolyte solution.

For example, the electrode assembly 10 may be formed by winding a stacked structure of the positive electrode plate 11, the negative electrode plate 13, and the separator 15 in a jelly roll configuration or by sequentially stacking the positive electrode plate 11, the negative electrode plate 13, and the separator 15 in a rectangular parallelepiped configuration. The positive electrode plate 11 may be formed by coating a positive active material on at least one surface of a positive current collector. The negative electrode plate 13 may be formed by coating a negative active material on at least one surface of a negative current collector.

In an embodiment of the present invention, the positive electrode plate 11 may be disposed at the outermost side of the electrode assembly 10. This is for the purpose of facilitating heat dissipation through the case 20 by arranging the positive current collector, which may generate a relatively great amount of heat, at the exterior side of the electrode assembly 10 adjacent to the case 20. For example, the positive current collector may be in direct contact with the case 20 or may be in thermal contact with at least the case 20. The phrase of one element being "in thermal contact with" another element may be used to mean that thermal exchange between the two elements is allowed even without direct contact between each other.

The electrode assembly 10 may be accommodated in the case 20 together with the electrolyte solution filled through a top opening in the case 20, and the top opening in the case 20 may be sealed by the cap plate 130. Contact portions of the cap plate 130 and the case 20 may be engaged with each other (e.g., sealed to each other) by laser welding, for example.

A positive electrode tab 17 and a negative electrode tab 19 may be connected to (e.g., coupled to) at least one location of the positive electrode plate 11 and the negative electrode plate 13, respectively.

Throughout the specification, the positive electrode tab 17 and the negative electrode tab 19 may be collectively referred to as electrode tabs 17 and 19, respectively. In a high-capacity, high-output battery, a plurality of positive electrode tabs 17 and a plurality of negative electrode tabs 19 may extend from the electrode assembly 10. A high output current can be obtained from the plurality of positive electrode tabs 17 and the plurality of negative electrode tabs 19 while reducing resistance loss. The plurality of positive electrode tabs 17 and the plurality of negative electrode tabs 19 may be separately provided and then attached to the positive electrode plate 11 and the negative electrode plate 13, respectively.

The positive electrode tabs 17 may be connected to the cap plate 130 itself, and the negative electrode tabs 19 may be connected to the negative electrode terminal 139 extending to a top surface of the cap plate 130. For example, a positive electrode terminal 137 and the negative electrode terminal 139 may be exposed to the top surface of the cap plate 130. The positive electrode terminal 137 may integrally protrude from the cap plate 130 or may be formed as a separate member mounted on the top surface of the cap plate 130. The positive electrode terminal 137 may have the same polarity as that of the cap plate 130 (e.g., a positive polarity). The negative electrode terminal 139 may be assembled to pass through the cap plate 130. The negative electrode terminal 139 may be engaged with the cap plate 130 in an insulating manner and may extend to the top surface of the cap plate 130.

The positive electrode tabs 17 and the negative electrode tabs 19 are aligned in respective openings 111 of the insulation spacer 110 and then fitted into the openings 111. The positive electrode tabs 17 and the negative electrode tabs 19, received in the insulation spacer 110, are connected to a positive electrode lead 127 and a negative electrode lead 129, respectively, within the insulation spacer 110.

Before the positive electrode tabs 17 are aligned with one of the openings 111 of the insulation spacer 110 and then fitted into the opening 111 to be assembled, they may be collected into one bundle and tack welded to be joined (e.g., focused). The positive electrode tabs 17, joined into one bundle through tack welding, can be more easily aligned in the opening 111 and fitted into the opening 111. Likewise, before the negative electrode tabs 19 are aligned with the other one of the openings 111 of the insulation spacer 110 and then fitted into the opening 111 for being assembled, they may be collected into one bundle and tack welded to be joined.

After being aligned with the opening 111 of the insulation spacer 110 and fitted into the opening 111, the positive electrode tabs 17 are positioned within the insulation spacer 110 and are exposed to the outside of the insulation spacer 110 through the opening 111.

The exposed positive electrode tabs 17 are connected to the positive electrode lead 127, and the positive electrode lead 127 is connected to the cap plate 130. Accordingly, the positive electrode tabs 17 of the electrode assembly 10 are electrically connected to (e.g., electrically coupled to) the cap plate 130 through the positive electrode lead 127. While the cap plate 130 generally has the same polarity as that of the positive electrode tabs 17 (e.g., a positive polarity), the positive electrode terminal 137 may be a protruding portion of the cap plate 130.

After being aligned with the other opening 111 of the insulation spacer 110 and fitted into the opening 111, the negative electrode tabs 19 are also positioned within the insulation spacer 110 and are exposed to the outside of the insulation spacer 110 through the opening 111. The exposed negative electrode tabs 19 are connected to the negative electrode lead 129, and the negative electrode lead 129 is connected to the negative electrode terminal 139. Accordingly, the negative electrode tabs 19 of the electrode assembly 10 are electrically connected to the negative electrode terminal 139 through the negative electrode lead 129. Throughout the specification, the positive electrode lead 127 and the negative electrode lead 129 may be collectively referred to as electrode leads 127 and 129, respectively.

The negative electrode terminal 139 is assembled to the cap plate 130 with an insulating gasket 135 interposed therebetween. A terminal opening 130' (e.g., a terminal hole) is formed in the cap plate 130 to allow the negative electrode terminal 139 to pass therethrough (e.g., to allow a portion of the negative electrode terminal 139 to pass therethrough). The negative electrode terminal 139 is fitted into the terminal opening 130' of the cap plate 130 with the gasket 135 interposed between the negative electrode terminal 139 and the cap plate 130 so that the negative electrode terminal 139 is electrically insulated from the cap plate 130. The gasket 135 seals the periphery of the terminal opening 130' to prevent leakage of the electrolyte solution contained in the case 20 and to prevent external impurities from permeating into the case 20.

An insulation plate 125 may be interposed between the negative electrode lead 129 and the cap plate 130 to achieve electrical insulation. The insulation plate 125, in cooperation with the gasket 135, may electrically insulate the cap plate 130 from the negative electrode lead 129 and may prevent the cap plate 130, electrically connected to the positive electrode tabs 17 of the electrode assembly 10, from electrically conducting with the opposite polarity (e.g., the insulation plate may assist in preventing a short-circuit). Terminal openings 125' and 129' (e.g., terminal holes) may be formed in the insulation plate 125 and in the negative electrode lead 129, respectively, to allow the negative electrode terminal 139 to pass therethrough.

The negative electrode terminal 139 is assembled to pass through terminal openings 130', 125', and 129' in the cap plate 130, the insulation plate 125, and the negative electrode lead 129, respectively, and a lower portion of the negative electrode terminal 139 is compressed on a bottom surface of the negative electrode lead 129, thereby coupling the cap plate 130, the insulation plate 125, and the negative electrode lead 129 to one another into a single body in a position-aligned manner.

For example, the cap plate 130, the insulation plate 125, and the negative electrode lead 129 are stacked such that they are laid one on top of another, the negative electrode terminal 139 is fitted into the terminal openings 130', 125', and 129' from the upper portion of the cap plate 130 for being assembled, and riveting or spinning is performed on the lower portion of the negative electrode terminal 139 exposed to the bottom surface of the negative electrode lead 129, thereby assembling the negative electrode terminal 139 in a state in which it is compressed on the bottom surface of the negative electrode lead 129.

The insulation spacer 110 is interposed between the electrode assembly 10 and the cap plate 130. The insulation spacer 110 may be made of an insulating material that does not react with the electrolyte solution, for example, polypropylene (PP), polyethylene (PE), ethylene propylene diene monomer (EPDM), or an equivalent thereof, but the insulation spacer 110 is not limited to the material listed herein. The insulation spacer 110 may prevent electrical interferences or electrical short circuits between the electrode assembly 10 and the cap plate 130. In addition, the insulation spacer 110 may align and place the plurality of electrode tabs 17 and 19 extending from the electrode assembly 10 at appropriate regions, thereby facilitating electrical connections between the electrode tabs 17 and 19 and the electrode leads 127 and 129, respectively.

For example, the plurality of positive electrode tabs 17 and the plurality of negative electrode tabs 19 upwardly protruding and extending from the electrode assembly 10 are respectively aligned with the openings 111 of the insulation spacer 110 to then be coupled to the other ones of the same electrode tabs, and bundles of the aligned and coupled positive electrode tabs 17 and bundles of the aligned and coupled negative electrode tabs 19 may be electrically connected to the positive electrode lead 127 and the negative electrode lead 129, respectively, by, for example, welding.

The insulation spacer 110 ensures an appropriate space between the electrode assembly 10 and the cap plate 130, thereby electrically insulating the electrode tabs 17 and 19 from the cap plate 130 even when the battery 100 is subjected to external impacts, such as high-frequency vibrations or fall shock.

Further, the openings 111 provided in the insulation spacer 110 are used as a welding space to permit welding to be performed between the electrode tabs 17 and 19 and the electrode leads 127 and 129, respectively. For example, the openings 111 may be formed at welding or assembling positions of the electrode tabs 17 and 19 and the electrode leads 127 and 129, respectively.

For example, the openings 111 may respectively allow the positive and negative electrode tabs 17 and 19 to pass therethrough and to be exposed to the outside of the insulation spacer 110, thereby facilitating welding or assembling the positive and negative electrode tabs 17 and 19 to the positive and negative electrode leads 127 and 129, respectively. For example, electrical resistance welding, laser welding, or ultrasonic welding between the positive and negative electrode tabs 17 and 19 and the positive and negative electrode leads 127 and 129, respectively, may be easily achieved. The insulation spacer 110 will be described in more detail below.

An insulation member 150 surrounds the insulation spacer 110 to prevent the openings 111 from being exposed to the outside, thereby insulating the electrode tabs 17 and 19 and the electrode leads 127 and 129 in a more secure manner. Moreover, the insulation member 150 surrounds the insulation spacer 110 and a top region of the electrode assembly 10, thereby mechanically coupling the insulation spacer 110 and the electrode assembly 10 to each other. The insulation member 150 will also be described in more detail below.

Figure 2A:
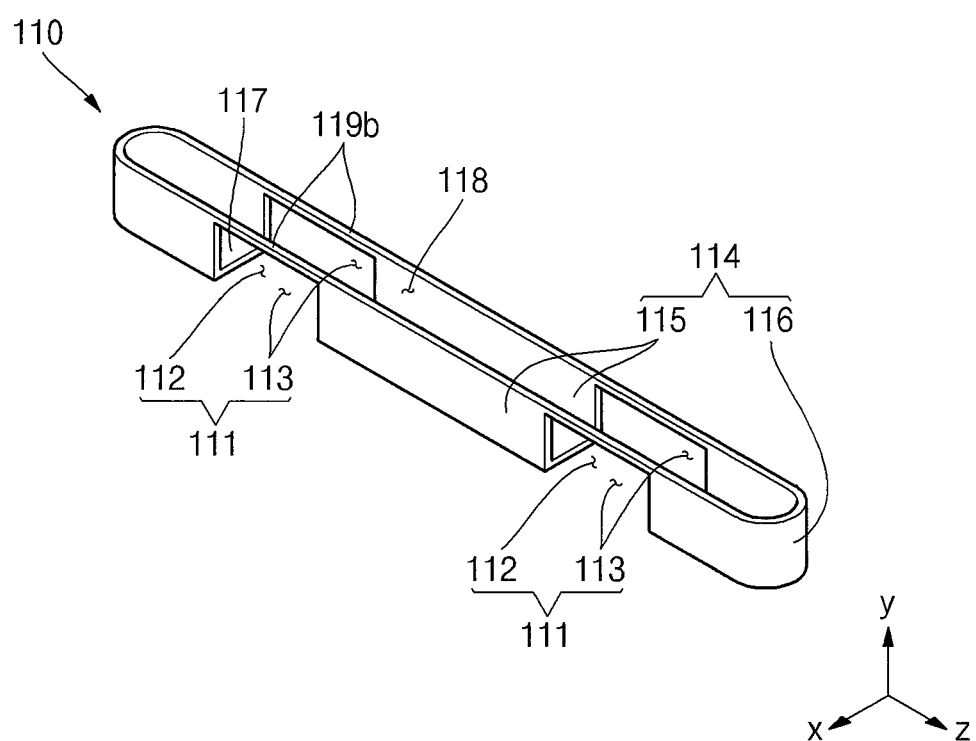
FIGS. 2A and 2B are perspective views illustrating embodiments of an insulation spacer of the battery.
Figure 2B:
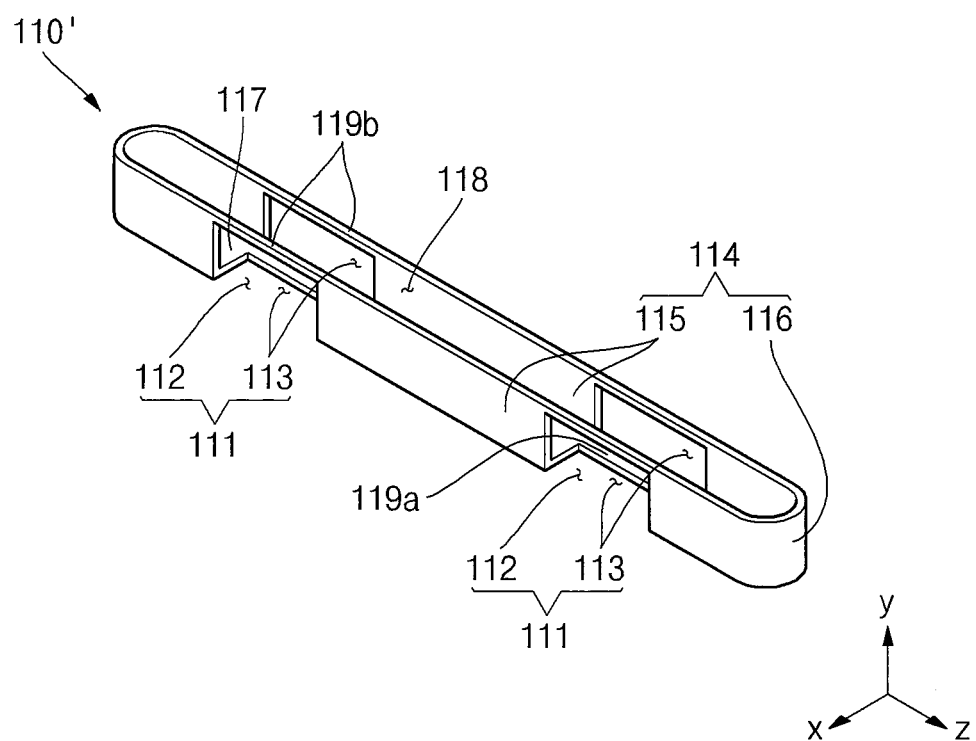

FIGS. 2A and 2B are perspective views illustrating embodiments of an insulation spacer of the battery, together with FIG. 1B.

As illustrated in FIGS. 2A and 2B, openings 111 are formed at a lower region and a side region of insulation spacers 110 and 110' to allow the electrode tabs 17 and 19 to be received in the insulation spacers 110 and 110' from the lower region (in the Y-axis direction) and/or the side region (in the X-axis direction) of the insulation spacers 110 and 110'. Because two electrode tabs are provided, two openings 111 located to respectively correspond to the two electrode tabs are formed. The respective openings 111 will now be described in more detail.

The openings 111 of each of the insulation spacers 110 and 110' each include a first opening 112 formed at the lower region (in the Y-axis direction) of each of the insulation spacers 110 and 110' and a second opening 113 (e.g., one or more second openings 113) formed at the side region (in the X-axis direction). The first opening 112 and the second opening 113 communicate with each other.

For example, each of the insulation spacers 110 and 110' may include a generally tubular body 114 and a bottom portion 117 closing a bottom end of the body 114. Each first opening 112 may be formed in (e.g., formed to pass through) the bottom portion 117. For example, each first opening 112 is formed at the lower region of each of the insulation spacers 110 and 110'.

In addition, the body 114 of each of the insulation spacers 110 and 110' includes a pair of long sides 115 spaced apart from each other and a pair of short sides 116 connected to the pair of long sides 115 and spaced apart from each other. The second openings 113 may pass through respective ones of the pair of long sides 115. For example, the second openings 113 are formed at the side regions of each of the insulation spacers 110 and 110'.

In this embodiment, the long side is a longer side than the short side, and the short side is a shorter side than the long side.

In addition, a hollow open portion 118 through which the first and second openings 112 and 113 communicate with each other may be formed by the body 114 and the bottom portion 117 of each of the insulation spacers 110 and 110'. The electrolyte solution may be accommodated in the open portion 118 so that the battery 100 according to this embodiment may have a space (e.g., an extra space) for receiving the electrolyte solution.

The bottom portion 117 of each of the insulation spacers 110 and 110' may be in direct or indirect contact with the electrode assembly 10, and a top end of the body 114 of each of the insulation spacers 110 and 110' may be in direct or indirect contact with the cap plate 130. In addition, the long sides 115 and the short sides 116 of the body 114 may be in direct or indirect contact with inner sidewalls of the case 20, thereby allowing the insulation spacers 110 and 110' to be stably supported between the electrode assembly 10, the cap plate 130, and the case 20. For example, each of the insulation spacers 110 and 110' may include three bottom portions 117 (e.g., three bottom portions 117 located adjacent to the first openings 112), and the three bottom portions 117 are brought into close contact with a top surface of the electrode assembly 10. An oval top end of the body 114 of each of the insulation spacers 110 and 110' is brought into close contact with a bottom surface of the cap plate 130, and the long sides 115 and the short sides 116 of the body 114 of each of the insulation spacers 110 and 110' are brought into close contact with an inner surface of the case 20. The insulation spacers 110 and 110' may prevent unnecessary or undesired electrical contact from occurring between the electrode assembly 10 and the cap plate 130. In these embodiments, the insulation member 150 is interposed between the long sides 115 and the short sides 116 of the body 114 of each of the insulation spacers 110 and 110' and the corresponding inner surface of the case 20, thereby improving a coupling force between the insulation spacer 110, 110' and the case 20.

As illustrated in FIGS. 2A and 2B, in order to increase strength of the insulation spacers 110 and 110', one or more reinforcement units 119a and 119b may be formed at a boundary region between the first opening 112 and the second opening 113 and at an upper area of the respective second openings 113, respectively. For example, the reinforcement units 119b may connect upper regions of separate long sides 115 (see FIG. 2A) and/or the reinforcement unit 119a may connect lower regions of separate long sides 115 (see FIG. 2B).

As illustrated in FIG. 2B, the reinforcement unit 119a may be formed only at rear of the first opening 112 to prevent the reinforcement unit 119a from interfering with the coupled electrode tabs 17 and 19.

As described above, according to embodiments of the present invention, the openings 111 are formed at the lower region and the side region of each of the insulation spacers 110 and 110', thereby easily allowing receiving of the electrode tabs 17 and 19, which extend from the electrode assembly 10, in the insulation spacer 110, 110' after being aligned with the lower region of the insulation spacer 110, 110', or/and easily allowing receiving of the electrode tabs 17 and 19 to the insulation spacer 110, 110' after being aligned with the side region of the insulation spacer 110, 110'. That is to say, according to embodiments of the present invention, alignment between the insulation spacer 110, 110' and the electrode tabs 17 and 19 can be easily achieved and the electrode tabs 17 and 19 can be easily received in the insulation spacer 110, 110'.

Further, because the width (in the X-axis direction) of the first opening 112 of the openings 111 of the insulation spacer 110, 110' is equal to the width of the bottom portion 117 and because the length (in the Z-axis direction) of each of the first and second openings 112 and 113 is greater than the length of each of the electrode tabs 17 and 19, the electrode tabs 17 and 19 are easily received in the first opening 112 of the insulation spacer 110, 110' from the lower region thereof (in the Y-axis direction) or/and the electrode tabs 17 and 19 are easily received in the second opening 113 of the insulation spacer 110, 110' from the side region thereof (in the X-axis direction). Accordingly, the electrode tabs 17 and 19 can be easily welded to the electrode leads 127 and 129.

Figure 3:
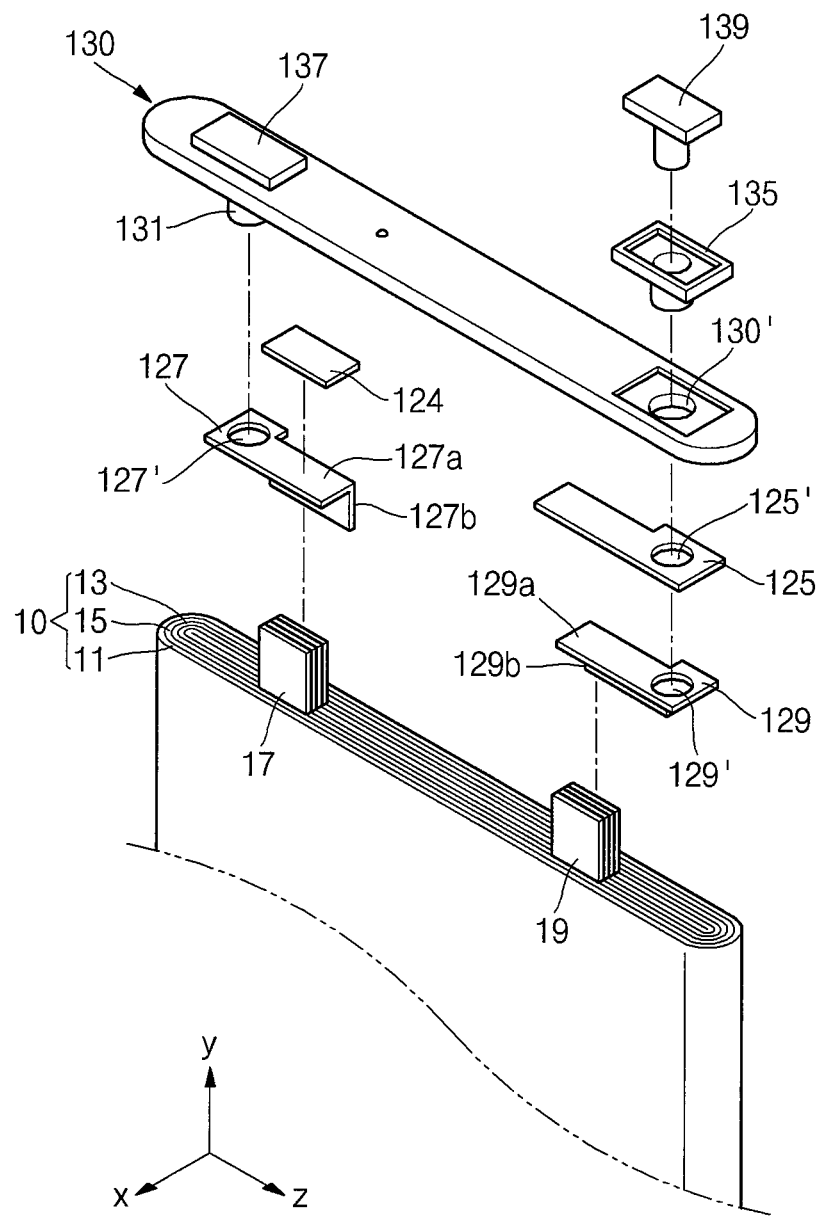
FIG. 3 is an exploded perspective view illustrating a connection relationship between respective electrode terminals, electrode leads, and electrode tabs of the battery according to an embodiment of the present invention.

FIG. 3 is an exploded perspective view illustrating a connection relationship between respective electrode terminals, electrode leads, and electrode tabs of a battery according to an embodiment of the present invention. For a better understanding of the present invention, an insulation spacer is not illustrated in FIG. 3 but may nonetheless be included in the embodiment illustrated in FIG. 3.

Referring to FIG. 3, a positive electrode lead 127 may be generally bent in an 'L' shape. For example, the positive electrode lead 127 may extend in two different directions. A first part 127a of the positive electrode lead 127 is disposed to face the cap plate 130 and is coupled to the cap plate 130. A second part 127b of the positive electrode lead 127 extends in a different direction from the first part 127a is disposed to face the positive electrode tabs 17 and is coupled to the positive electrode tabs 17. For example, the positive electrode lead 127 may extend in different directions so as to face both the cap plate 130 and the positive electrode tabs 17 as coupling counterparts.

A negative electrode lead 129 may be generally bent in an 'L' shape. For example, a first part 129a of the negative electrode lead 129 is disposed to face the cap plate 130 and is coupled to the cap plate 130. A second part 129b of the negative electrode lead 129 extends in a different direction from the first part 129a, is disposed to face the negative electrode tabs 19, and is coupled to the negative electrode tabs 19. For example, the negative electrode lead 129 may be configured to extend in different directions so as to face the cap plate 130 and the negative electrode tabs 19 as coupling counterparts. However, the configuration of the negative electrode lead 129 is not limited to that disclosed herein, and the negative electrode lead 129 may have a planar shape, for example.

Similar to the insulation plate 125 disposed between the cap plate 130 and the negative electrode lead 129, an insulation plate 124 may be disposed between the cap plate 130 and the positive electrode lead 127. Hereinafter, the insulation plate 125 disposed at a side of the negative electrode lead 129 will be referred to as a negative electrode insulation plate 125 and the insulation plate 124 disposed at a side of the positive electrode lead 127 will be referred to as a positive electrode insulation plate 124.

The positive electrode insulation plate 124 may be provided to maintain balance with respect to the negative electrode insulation plate 125. For example, the positive electrode insulation plate 124 interposed between the cap plate 130 and the positive electrode lead 127 may be provided to maintain a height balance between the cap plate 130 and the negative electrode lead 129. In addition, the positive electrode insulation plate 124 may be interposed between the cap plate 130 and the positive electrode lead 127 to increase a coupling strength when they are compressively coupled to each other by a coupling pin 131.

Figure 4:
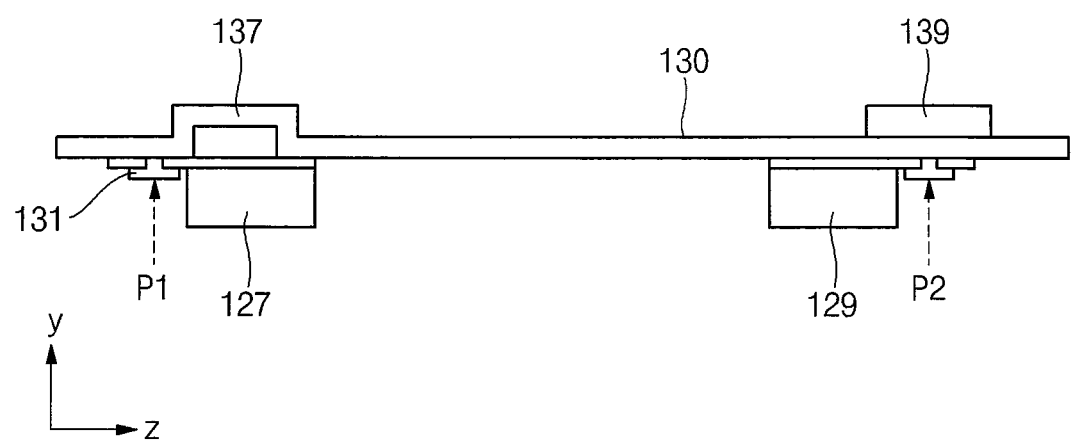
FIG. 4 is a side view illustrating a connection relationship between respective electrode terminals and electrode leads of the battery according to an embodiment of the present invention.

FIG. 4 is a side view illustrating a connection relationship between the respective electrode terminals and electrode leads of the battery according to an embodiment of the present invention.

Referring to FIG. 4, the positive electrode lead 127 may be coupled to the cap plate 130 by the coupling pin 131 protruding from the cap plate 130. For example, the coupling pin 131 protruding from the bottom surface of the cap plate 130 is assembled to pass through a terminal opening 127' (e.g., a terminal hole) of the positive electrode lead 127, and a bottom end of the coupling pin 131 exposed to the bottom surface of the positive electrode lead 127 may be compressively coupled to the bottom surface of the positive electrode lead 127 by riveting or spinning into a coupling position P1. During riveting, for example, the bottom end of the coupling pin 131 exposed to the bottom surface of the positive electrode lead 127 may be compressed on the bottom surface of the positive electrode lead 127 by striking the bottom end of the coupling pin 131 using a hammer. During spinning, the bottom end of the coupling pin 131 exposed to the bottom surface of the positive electrode lead 127 may be compressed on the bottom surface of the positive electrode lead 127 while pressing the bottom end of the coupling pin 131 using a processing tool rotating at a high speed. In another embodiment of the present invention, the positive electrode lead 127 and the cap plate 130 may be coupled to each other by welding.

When the lower portion of the negative electrode terminal 139 is compressed on the bottom surface of the negative electrode lead 129, welding may be additionally performed on the lower portion of the negative electrode terminal 139 to more tightly couple the negative electrode terminal 139 to the negative electrode lead 129 into a coupling position P2. The coupling between the negative electrode terminal 139 and the negative electrode lead 129 forms a charging/discharging path of a negative electrode. The upper portion of the negative electrode terminal 139 protrudes from its cylindrical body to have a plate-like shape to then be on (e.g., compressed on) the top surface of the cap plate 130.

Figure 5:
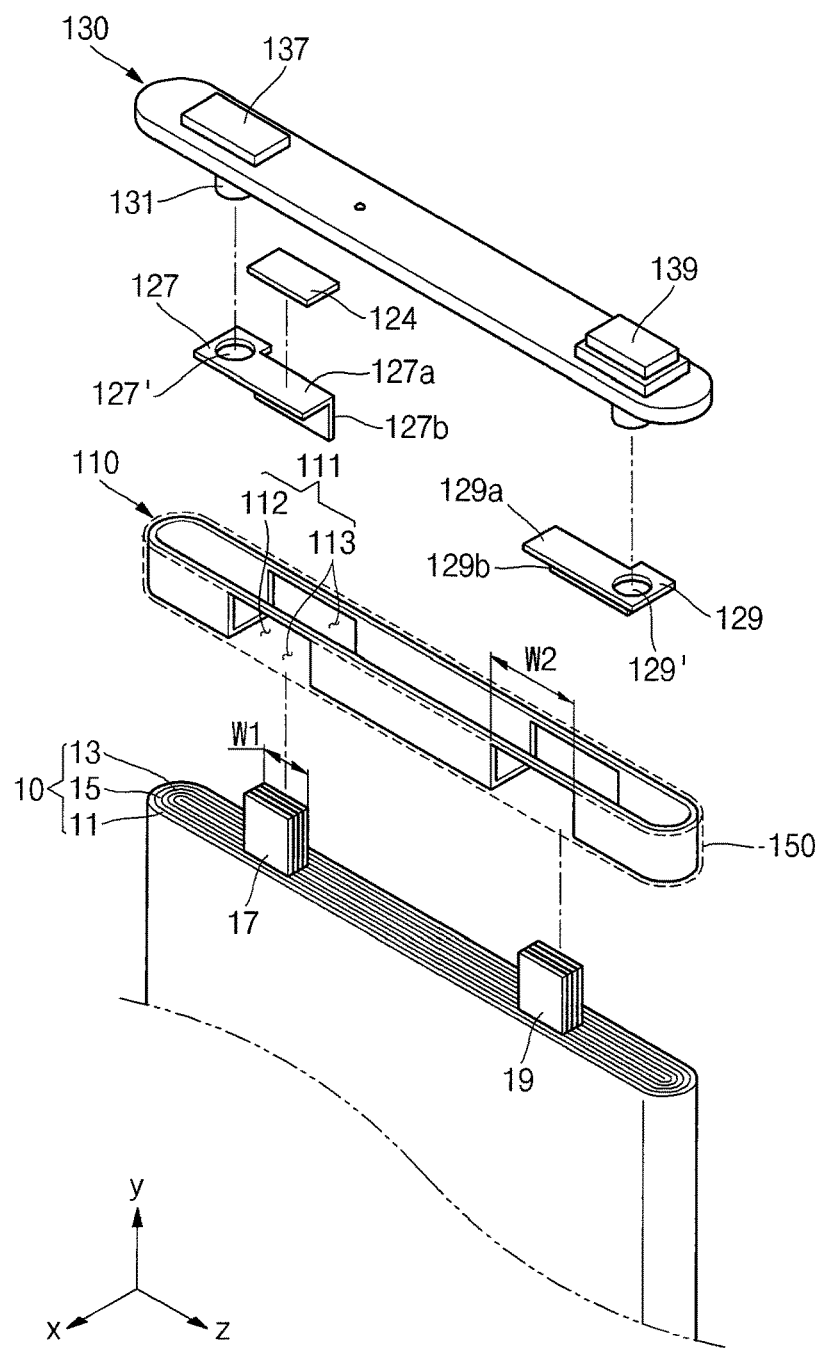
FIG. 5 is an exploded perspective view illustrating a connection relationship between respective electrode terminals, an insulation spacer, and electrode tabs of the battery according to an embodiment of the present invention.

FIG. 5 is an exploded perspective view illustrating a connection relationship between respective electrode terminals, an insulation spacer, and electrode tabs in a battery according to an embodiment of the present invention.

Referring to FIG. 5, a short-side width W2 of each of the openings 111 may be greater than a width W1 of each of the electrode tabs 17 and 19. Thus, the respective welding strength between the electrode tabs 17 and 19 and the electrode leads 127 and 129 may be increased by permitting a welding bar (T in FIG. 7) to contact a greater surface area and improve workability. For example, the width W1 of the electrode tabs 17 and 19 and the width W2 of the openings 111 may satisfy the following relationship: W1<W2.

After the welding of the electrode tabs 17 and 19 and the electrode leads 127 and 129 is completed, the openings 111 may be finished by (e.g., surrounded by) the insulation member 150. For example, the insulation member 150 seals the openings 111 (e.g., the second openings 113) to cover the electrode tabs 17 and 19 and the electrode leads 127 and 129 so they are not exposed to the outside. For example, the insulation member 150 may be provided as an adhesive tape adhered along the outer circumference of the insulation spacer 110 to entirely surround the pair of openings 111 (e.g., the second openings 113) where the positive electrode tabs 17 and the negative electrode tabs 19 are coupled. Accordingly, the electrode tabs 17 and 19 and the electrode leads 127 and 129 may not come in contact with the inner surface of the case 20 through the openings 111 (e.g., the second openings 113). Further, as described above, the insulation member 150 may surround only the insulation spacer 110 or/and may surround the insulation spacer 110 and at least a portion (e.g., an upper portion) of the electrode assembly 10, thereby mechanically coupling the insulation spacer 110 and the electrode assembly 10. In addition, the insulation member 150 may prevent the insulation spacer 110 and the electrode assembly 10 from rotating or moving within the case 20.

The insulation member 150 may include a material having an adhesive property and being reactive with an electrolyte solution. For example, the insulation member 150 may be a (e.g., may be prepared by a) polymer film (e.g., a tape) that melts to have an adhesive property when it reacts with an electrolyte solution including, for example, a carbonate solvent, such as dimethyl carbonate (DMC), ethyl methyl carbonate (EMC), diethyl carbonate (DEC), propylene carbonate (PC), or the like, that permeates between polymer molecules of the insulation member 150. For example, an oriented polystyrene (OPS) film may be used as the insulation member 150.

Figure 6:
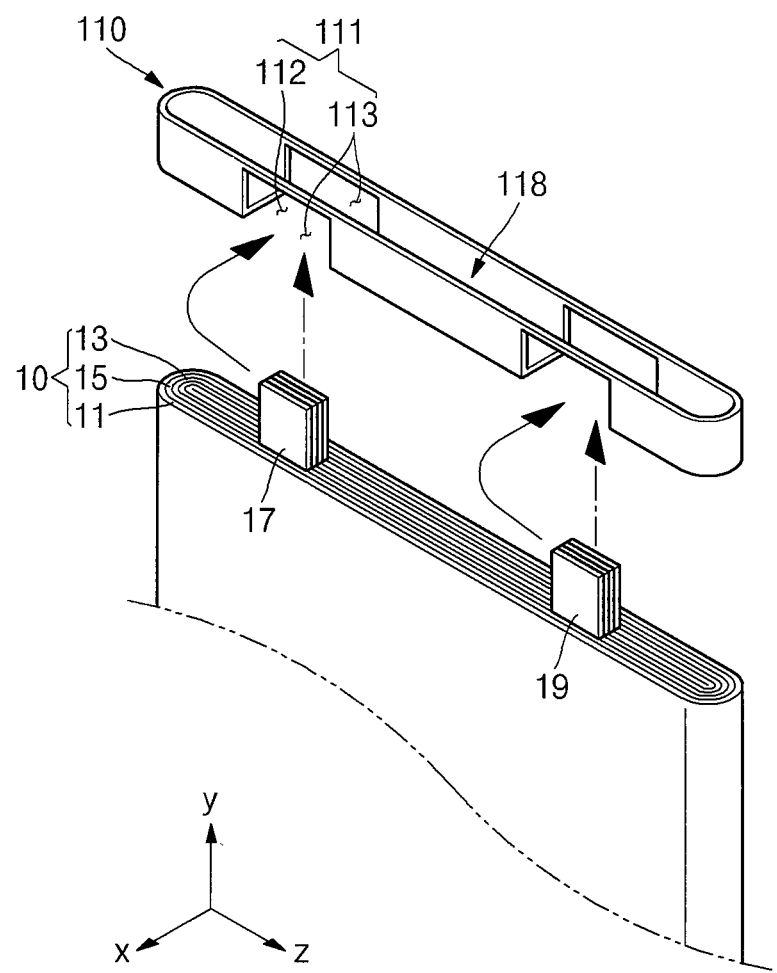
FIG. 6 is a perspective view illustrating a direction in which electrode tabs are received in an insulation spacer of the battery according to an embodiment of the present invention.

Referring to FIG. 6, electrode tabs 17 and 19 extending from an electrode assembly 10 may be received in the open portion 118 upwardly from a lower region of the insulation spacer 110 through the respective first openings 112 provided in the insulation spacer 110. Alternatively, the electrode tabs 17 and 19 may be received in the open portion 118 from one side (e.g., a front region) to the other side (e.g., a rear region) of the insulation spacer 110 through the respective second openings 113 provided in the insulation spacer 110. The electrode tabs 17 and 19 may also be received in the open portion 118 through respective boundary regions between the first and second openings 112 and 113. Whatever an embodiment may provide, the electrode tabs 17 and 19 are exposed to the outside (e.g., the front and rear regions) through the respective second openings 113 provided in the insulation spacer 110, thereby allowing the electrode leads 127 and 129 and the welding bar T to easily approach the electrode tabs 17 and 19.

The width (in the X-axis direction) of the first openings 112 is equal to a distance between the pair of spaced-apart long sides 115 provided in the insulation spacer 110 and/or the length (in the Z-axis direction) of the first openings 112 is greater than the length of each of the electrode tabs 17 and 19, thereby easily achieving alignment between the electrode tabs 17 and 19 and the first openings 112. In addition, the length (in the Z-axis direction) of the second openings 113 is greater than the length of each of the electrode tabs 17 and 19, thereby easily achieving alignment between the electrode tabs 17 and 19 and the second openings 113. Moreover, the bottom portion 117 of the insulation spacer 110 is brought into close contact with the top surface of the electrode assembly 10, thereby allowing the insulation spacer 110 to be stably positioned on an upper portion of the electrode assembly 10.

Figure 7:
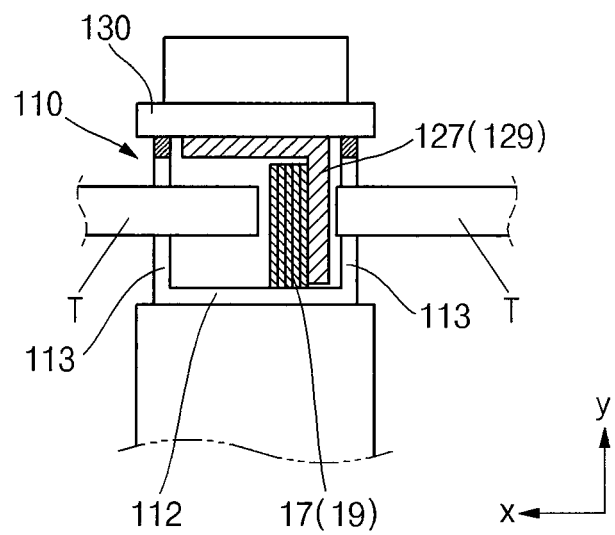
FIG. 7 illustrates a state in which electrode tabs are coupled to electrode leads within an insulation spacer of the battery according to an embodiment of the present invention.

FIG. 7 illustrates a state in which electrode tabs are coupled to electrode leads within an insulation spacer in a battery according to an embodiment of the present invention.

Referring to FIG. 7, welding between the electrode tabs 17 and 19 and the electrode leads 127 and 129 may be performed in such a manner that welding bars T having different polarities are allowed to face and to approach each other in forward and backward directions. The electrode tabs 17 and 19 and the electrode leads 127 and 129 are positioned between the welding bars T and are brought into contact with each other and a welding current is applied.

The second openings 113 of the insulation spacer 110 permit the welding bars T to approach in the forward and backward directions (e.g., the X-axis direction). For example, the second openings 113 may be formed adjacent to front and rear regions of the welding positions of the electrode tabs 17 and 19. As described above, the first openings 112 are formed at the lower region of the insulation spacer 110 so that the electrode tabs 17 and 19 may be easily fitted into the insulation spacer 110.

According to embodiments of the present invention, laser welding or ultrasonic welding in addition to electrical resistance welding may be easily performed. In some embodiments, the electrode tabs and the electrode leads may also be coupled to each other by another mechanical structure, for example, a riveting structure.

Figure 8A:
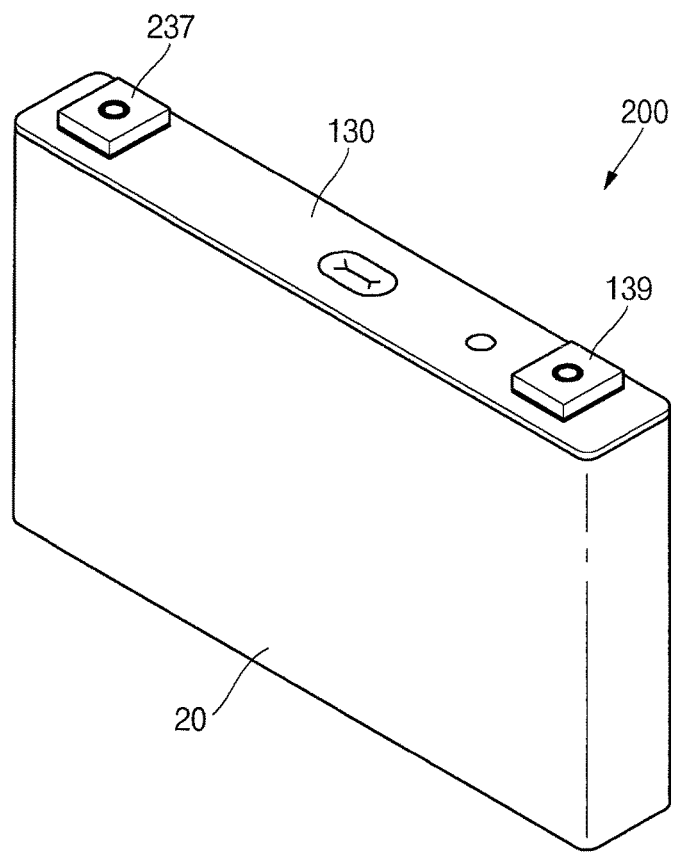
FIGS. 8A, 8B, and 8C are a perspective view, a cross-sectional view, and an exploded perspective view, respectively, illustrating a battery according to another embodiment of the present invention.
Figure 8B:
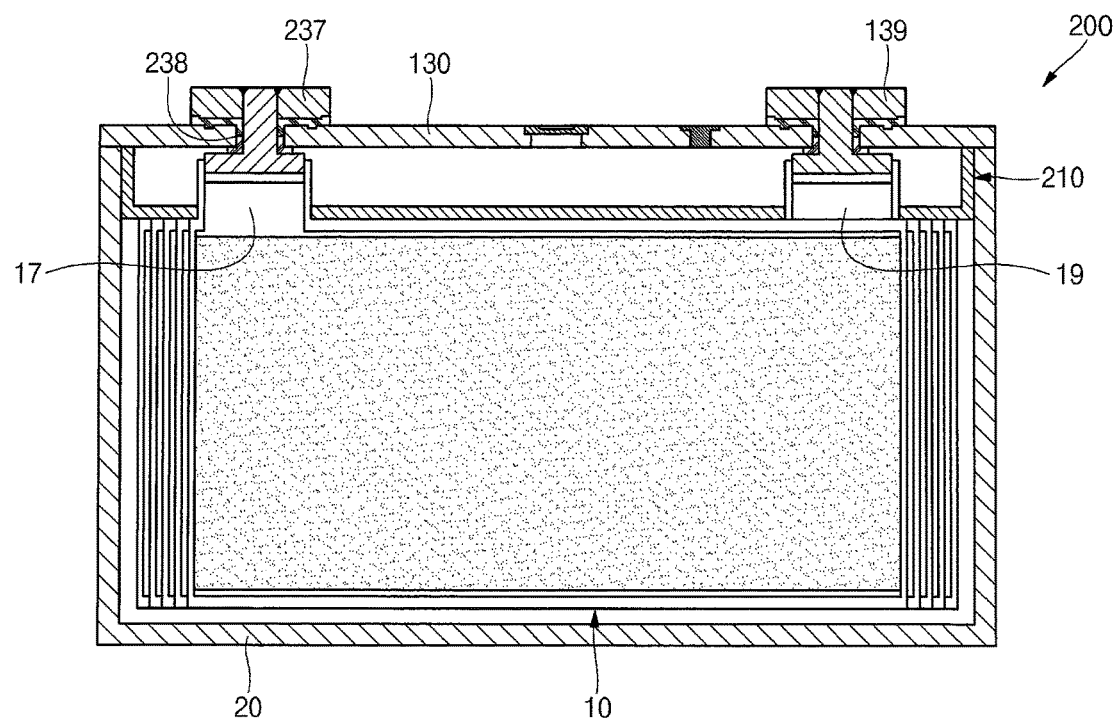
Figure 8C:
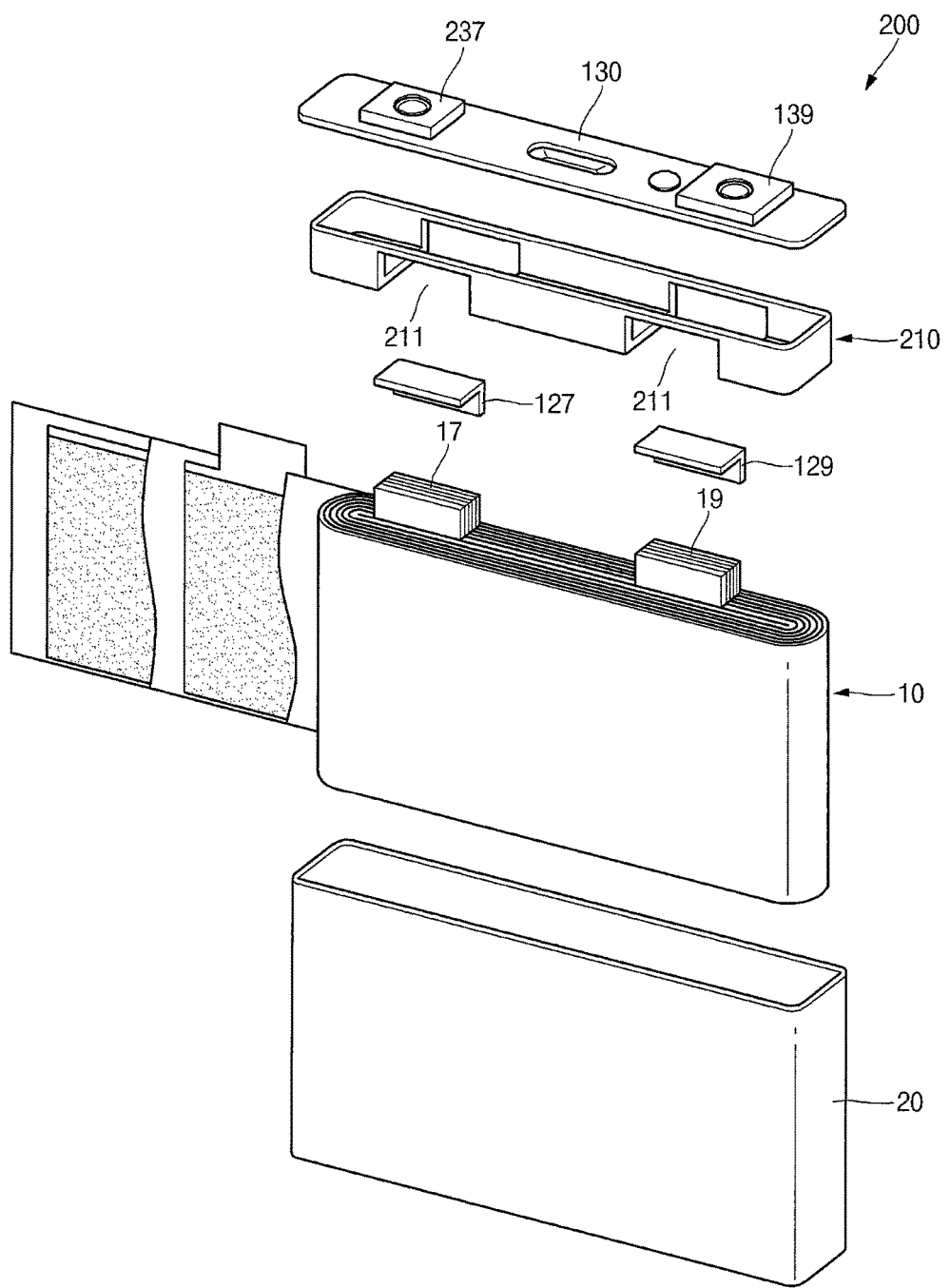

FIGS. 8A, 8B, and 8C are a perspective view, a cross-sectional view, and an exploded perspective view, respectively, illustrating a battery according to another embodiment of the present invention.

The battery 200 shown in FIGS. 8A to 8C may be employed in an electric vehicle, a hybrid vehicle, or the like. Furthermore, because a basic configuration of the battery 200 shown in FIGS. 8A to 8C is substantially the same as that of the battery 100 shown in FIGS. 1A and 1B, the following description will focus on differences between the batteries 100 and 200.

As illustrated in FIGS. 8A to 8C, an insulation spacer 210 is positioned between a cap plate 130 and an electrode assembly 10 and includes openings 211 each having open lower and side regions. Electrode tabs 17 and 19 extending from the electrode assembly 10 are received through the respective openings 211, and electrode leads 127 and 129 connected to electrode terminals 137 and 139 are positioned within the respective openings 211. Therefore, the electrode tabs 17 and 19 and the electrode leads 127 and 129 may be respectively welded to each other within the openings 211.

In order to ensure safety of the battery 200 for use in an electric vehicle when the battery 200 is penetrated or punctured, the cap plate 130 and the case 20 should not have polarities (e.g., should not be biased) so that a positive electrode terminal 237 may be insulated from the cap plate 130 similar to a negative electrode terminal 139. To this end, the positive electrode terminal 237 may be electrically insulated from the cap plate 130 by an insulating gasket 238.

Figure 9:
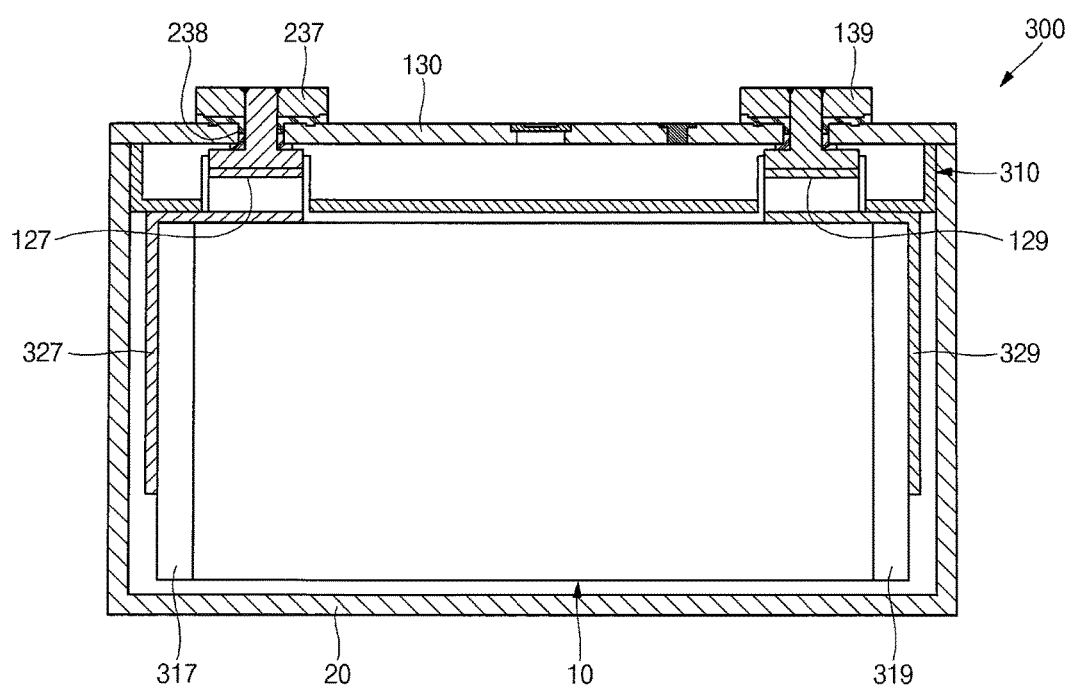
FIG. 9 is a cross-sectional view illustrating a battery according to still another embodiment of the present invention.

FIG. 9 is a cross-sectional view illustrating a battery according to still another embodiment of the present invention.

Because the battery 300 shown in FIG. 9 is substantially the same as the battery 200 shown in FIGS. 8A to 8C, the following description will focus on differences between the batteries 200 and 300.

As shown, uncoated portions 317 and 319 of the electrode assembly 10 are accommodated in a case 20 in a state in which they are positioned in opposite, horizontal directions of FIG. 9, rather than in an upward direction, of the electrode assembly 10. Therefore, in order to respectively electrically connect the uncoated portions 317 and 319 of the electrode assembly 10 to electrode terminals 137 and 139, current collector tabs 327 and 329 may be provided. The current collector tabs 327 and 329 are respectively connected to the uncoated portions 317 and 319 of the electrode assembly 10 and bent multiple times to be respectively electrically connected to the electrode terminals 137 and 139.

As described above, an insulation spacer 310 having openings is interposed between the electrode assembly 10 and the cap plate 130. Upper regions of the current collector tabs 327 and 329 are received in the openings and may be directly coupled to respective electrode leads 127 and 129 that are pre-coupled to the electrode terminals 137 and 139 in the openings or may be directly coupled to the electrode terminals 137 and 139.

Although batteries according to example embodiments of the present invention have been described in detail hereinabove, it should be understood that many variations and modifications of the basic inventive concept herein described, which may appear to those skilled in the art, fall within the spirit and scope of the present invention as defined by the appended claims and their equivalents.

What is claimed is:

1. A battery comprising:
   an electrode assembly;
   a positive electrode tab and a negative electrode tab each extending from the electrode assembly;
   an insulation spacer having:
      a bottom portion and a top portion, the bottom portion being nearer to the electrode assembly than the top portion is,
      first openings in the bottom portion of the insulation spacer and through which the positive and negative electrode tabs respectively extend, and
      second openings at a side region of the insulation spacer respectively corresponding to the first openings, the second openings being defined by the top portion and the side region of the insulation spacer; and
   a positive electrode lead and a negative electrode lead respectively coupled to the positive and negative electrode tabs in the insulation spacer.

2. The battery of claim 1, wherein the corresponding ones of the first openings and the second openings are continuous with each other.

3. The battery of claim 1, further comprising an insulation member surrounding the side region of the insulation spacer and covering the second openings.

4. The battery of claim 1, wherein the insulation spacer comprises a pair of long sides spaced apart from each other and a pair of short sides connected to the pair of long sides and spaced apart from each other, the bottom portion being at a bottom end of the long sides and the short sides.

5. The battery of claim 4, wherein the insulation spacer has an open portion between the long sides and the short sides.

6. The battery of claim 4, wherein the bottom portion of the insulation spacer contacts the electrode assembly.

7. The battery of claim 4, wherein the second openings are in at least one of the pair of long sides.

8. The battery of claim 7, wherein a reinforcement unit is at a boundary region between the corresponding ones of the first openings and the second openings.

9. The battery of claim 7, wherein a reinforcement unit extends across the second openings at a top end of one of the long sides.

10. The battery of claim 7, wherein widths of the first and second openings are greater than respective widths of the positive electrode tab and the negative electrode tab.

11. The battery of claim 7, wherein a reinforcement unit extends across the second openings at the bottom end of one of the long sides.

12. The battery of claim 1, wherein the positive electrode tab and the negative electrode tab extend in a straight line from an upper end of the electrode assembly along their entire lengths.

* * * * *